UNITED STATES PATENT OFFICE.

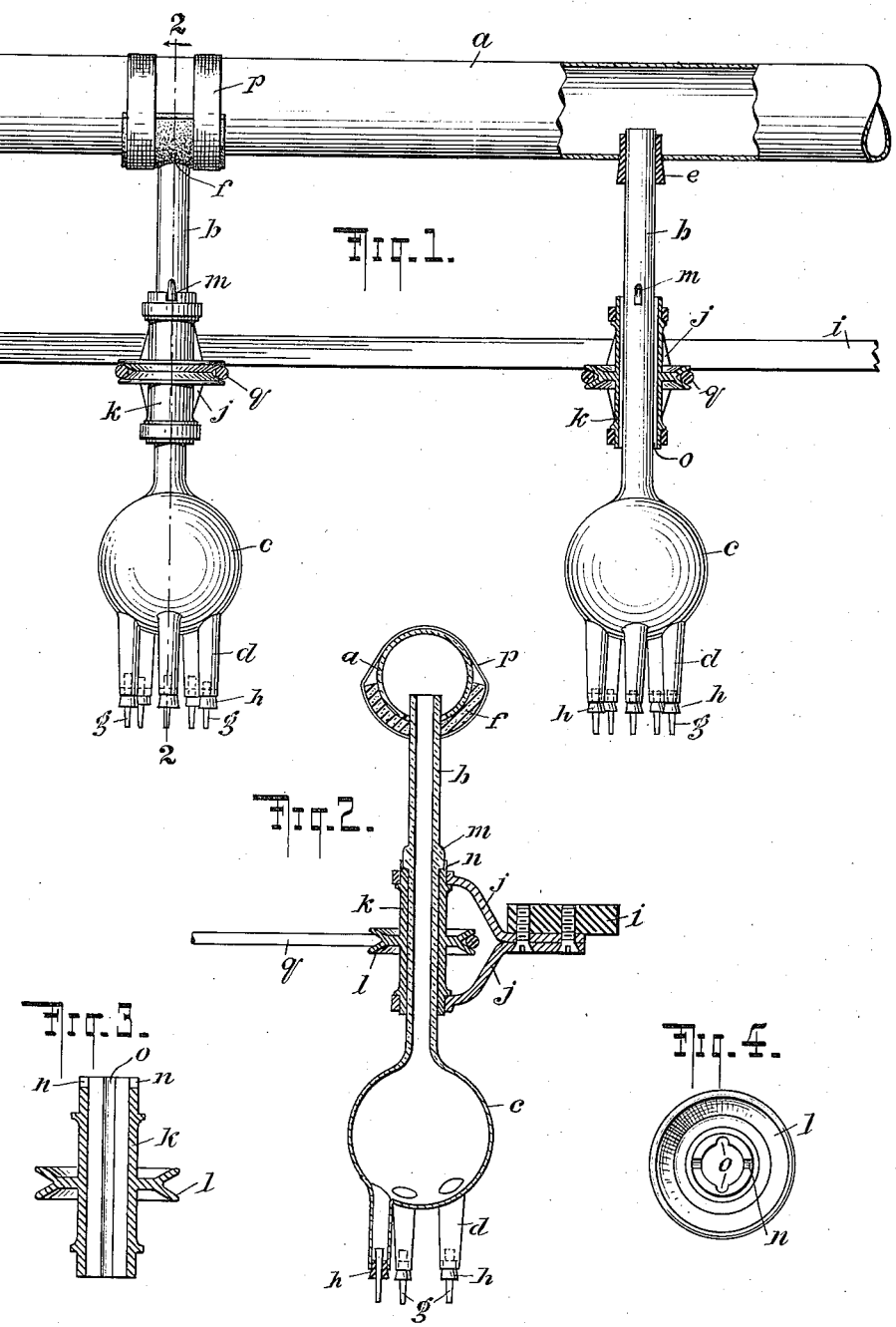

HARRY C. WHRITNER, OF NEW YORK, N. Y.

MECHANISM FOR PRODUCING ARTIFICIAL SILK.

1,155,777.  Specification of Letters Patent. Patented Oct. 5, 1915.

Application filed March 1, 1910. Serial No. 546,587.

*To all whom it may concern:*

Be it known that I, HARRY C. WHRITNER, a citizen of the United States, and a resident of the borough of Manhattan, city, county, and State of New York, have invented certain new and useful Improvements in Mechanism for Producing Artificial Silk.

My invention relates to that portion of apparatus employed in the manufacture of artificial silk in which the viscous liquid is transformed into fine raw fibers and has for its object to create mechanism whereby the raw thread produced is caused to comprise a number of twisted filaments of great fineness.

In the drawings Figure 1 is a side view partly in section showing two adjacent filament producing devices and their connections with the source of supply of viscous fluid. Fig. 2 is a sectional view through the line 2—2 of Fig. 1; Fig. 3 is a sectional view of a pulley carrying member; and Fig. 4 is a top view thereof.

In the drawings, $a$ is a source of supply through which the viscous liquid is fed into the individual thread forming devices. The pipe $a$ is preferably made of glass. From the pipe $a$ the fluid descends into the stem $b$ of the filament forming bulbs $c$ and nipples $d$. These three parts, $b$, $c$, $d$ are preferably made of glass and of a single piece. The connection between the stem $b$ and the pipe $a$ is shown as a cork $e$ at the right of Fig. 1, and as a perforated piece of felt $f$, on the left hand of Fig. 1 and in Fig. 2. Small tubes or funnels of glass $g$ having extremely fine orifices are connected to the nipples $d$ by means of the corks $h$ or other suitable means such as rubber tubes or the like.

Mounted upon the stationary frame $i$ are the fixed brackets $j$. These brackets $j$ carry rotatively the pulley carrying member or driving sleeve $k$. The pulleys $l$ on these members are controlled and rotated by belts from a common shaft so that a large number of these spindles can be similarly rotated simultaneously. The stem $b$ fits the interior orifice of this member $k$ and when in operation, the oppositely disposed lugs $m$ preferably forming part of the stem $b$ rest within the recesses $n$ of the member $k$ whereby a detachable driving connection is formed between the stem and the driving sleeve. If, for any cause, it is desired to remove the bulb and stem $c$, $b$ entirely, this can readily be done without disturbing the operation of the remaining portions of the entire mechanism by pushing the stem $b$ upwardly until the lugs $m$ become disengaged from the recesses $n$, then turning the stem $b$ 90° whereupon the lugs $m$ will come into register with the oppositely disposed grooves $o$ located on the interior surface of the member $k$. The stem $b$ and its connections can then be entirely withdrawn from the apparatus. The aperture where the stem $b$ and the pipe $a$ connect is plugged up and the entire factory is undisturbed while repairs or changes can be made in any one spindle. The connection $f$ comprises a fine piece of felt taped or otherwise fastened to the pipe $a$ by means of the tapes $p$ and has a special advantage of permitting a rotation of the stem $b$ in the felt packing and avoiding entirely all strain on the glass composing either the pipe $a$ or the stem $b$. The cork connection $e$ creates such a strain and is less desirable for this reason than the felt connection. The operating belts are indicated as $q$.

From the above description it will be seen that my device is simply disassociatable in all its parts and is capable of producing artificial silk without permitting the viscous liquid coming into contact with air at any point. As the spindles are rotated by the operation of the belts $q$ the viscous liquid passes through the fine orifices of the funnels or tubes $g$ from which very slender filaments are squirted, so to speak, and simultaneously twisted into a strand at fairly slow speed. Any number of spindles can be operated at the same time so that any desired quantity of thread can be produced at any one time. The twisted threads in the raw condition in which they emerge from the device above described are removed from time to time and passed through the finishing chemical and physical processes.

Having thus described the nature of my invention what I claim is:

1. In a device for making artificial silk, the combination of a source of supply, a rotating part terminating in a multiplicity of apertures, a corresponding number of fine orificed tubes located adjacent to said apertures and joined thereto by a flexible connection.

2. In a device for making artificial silk, the combination of a vitreous bulb provided with an integral stem, and with a plurality of integral depending nipples, a tube detachably connected with each of said nipples, said tubes having minute discharge orifices, a source of supply, the upper end of said
5 stem extending into said source of supply and being connected therewith by a flexible connection, a driving sleeve surrounding a part of and having a detachable driving connection with said stem and a bracket rotatably supporting said driving sleeve.

HARRY C. WHRITNER.

Witnesses:
 JOHN A. KEHLENBECK,
 G. V. RASMUSSEN.